No. 629,994. J. S. HEATH. Patented Aug. 1, 1899.
SEEDING AND FERTILIZING MACHINE.
(Application filed Nov. 7, 1898.)

(No Model.) 10 Sheets—Sheet 1.

Fig. 1.

Witnesses
J. J. Colbourne
H. H. G. Ardagh.

Inventor
James S. Heath
by
Ridout & Maybee.
Attys

No. 629,994. Patented Aug. 1, 1899.
J. S. HEATH.
SEEDING AND FERTILIZING MACHINE.
(Application filed Nov. 7, 1898.)

(No Model.) 10 Sheets—Sheet 3.

Witnesses
A. J. Colbourne
H. H. G. Ardagh

Inventor
James S. Heath
by
Ridout & Maybee
Attys.

No. 629,994. Patented Aug. 1, 1899.
J. S. HEATH.
SEEDING AND FERTILIZING MACHINE.
(Application filed Nov. 7, 1898.)

(No Model.) 10 Sheets—Sheet 4.

Witnesses
A. J. Colbourne
H. H. G. Ardagh

Inventor
James S. Heath
by Ridout & Maybee
atty's

THE NORRIS PETERS CO., PHOTO-LITHO., WASHINGTON, D. C.

No. 629,994. Patented Aug. 1, 1899.
J. S. HEATH.
SEEDING AND FERTILIZING MACHINE.
(Application filed Nov. 7, 1898.)
(No Model.) 10 Sheets—Sheet 5.

Witnesses
A. J. Colbourne
H. H. G. Ardagh

Inventor
James S. Heath
by
Ridout & Maybee
Attys

No. 629,994. Patented Aug. 1, 1899.
J. S. HEATH.
SEEDING AND FERTILIZING MACHINE.
(Application filed Nov. 7, 1898.)
(No Model.) 10 Sheets—Sheet 6.

Witnesses
A. J. Colbourne.
H. H. G. Ardagh.

Inventor
James S. Heath
by
Ridout & Maybee
Attys

No. 629,994. Patented Aug. 1, 1899.
J. S. HEATH.
SEEDING AND FERTILIZING MACHINE.
(Application filed Nov. 7, 1898.)

(No Model.) 10 Sheets—Sheet 8.

Witnesses
A. J. Colbourne.
H. H. G. Ardagh.

Inventor
James S. Heath
by
Ridout & Maybee
attys

No. 629,994. Patented Aug. 1, 1899.
J. S. HEATH.
SEEDING AND FERTILIZING MACHINE.
(Application filed Nov. 7, 1898.)
(No Model.) 10 Sheets—Sheet 9.

Witnesses
J. J. Colbourne
H. H. G. Ardagh

Inventor
James S. Heath
by Didout & Maybee
attys

No. 629,994. Patented Aug. 1, 1899.
J. S. HEATH.
SEEDING AND FERTILIZING MACHINE.
(Application filed Nov. 7, 1898.)

(No Model.) 10 Sheets—Sheet 10.

Witnesses
Q. J. Colbourne.
N. C. Dickson

Inventor
James S. Heath
by Ridout & Maybee
Atty's

UNITED STATES PATENT OFFICE.

JAMES S. HEATH, OF TORONTO, CANADA.

SEEDING AND FERTILIZING MACHINE.

SPECIFICATION forming part of Letters Patent No. 629,994, dated August 1, 1899.

Application filed November 7, 1898. Serial No. 695,705. (No model.)

*To all whom it may concern:*

Be it known that I, JAMES SAMUEL HEATH, mechanic, of the city of Toronto, in the county of York and Province of Ontario, Canada, have invented certain new and useful Improvements in Seeding and Fertilizer Machines, (for which I have been granted Letters Patent in the Dominion of Canada on the 17th of November, 1898, under number 61,746,) of which the following is a specification.

The objects of my invention are, first, to devise an economically-constructed seeding and fertilizer distributing machine in which drill-hoes, drill-shoes, or spring-teeth may be used as desired upon the same drag-bars; second, to improve the construction of the drag-bars, locking mechanism, and means of adjustment; third, to improve the zigzagging mechanism and the lifting and pressure mechanism of the drag-bars; fourth, to improve the construction of the grass-seed distributers; fifth, to improve the construction of the fertilizer-distributers and the means of regulating the same, and, sixth, to improve the construction of the grain-distributers and the means of operating the same; and it consists, essentially, of the details of construction, as hereinafter specifically described and then definitely claimed.

In the drawings like letters of reference indicate corresponding parts in the different figures.

Figure 1:
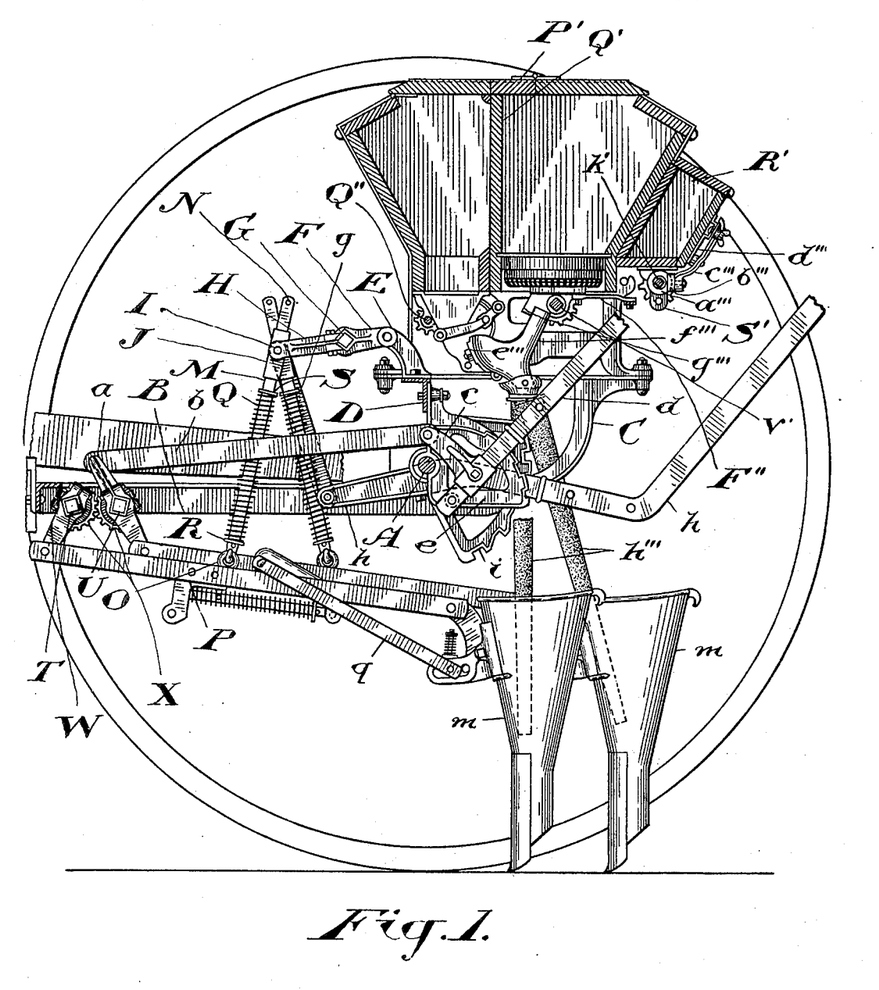
Figure 1 is a sectional elevation of my improved machine, showing the drag-bars zigzagged and with drill-hoes connected thereto.
Figure 2:
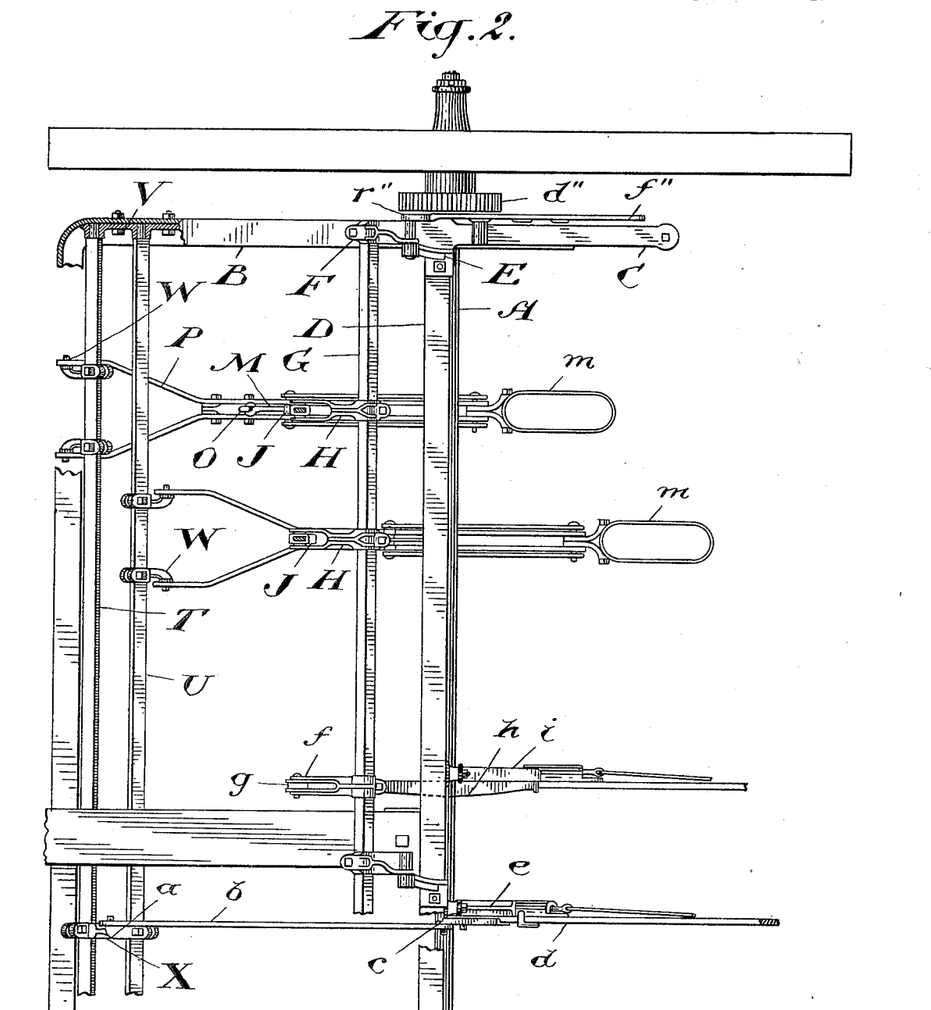
Fig. 2 is a plan view of one-half of my improved machine with the hopper removed, two zigzagged drag-bars with drill-hoes attached being shown.
Figures 3, 6:
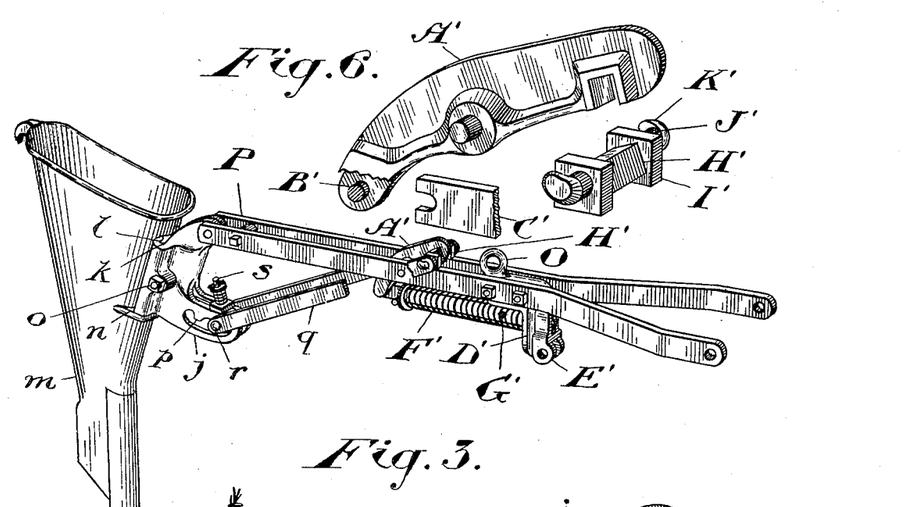
Fig. 3 is a perspective view of a drag-bar with a drill-hoe attached.
Fig. 6 is a perspective detail, partly broken away, showing the locking-lever and adjusting-stud and the rearward end of the spring-plunger.
Figure 4:
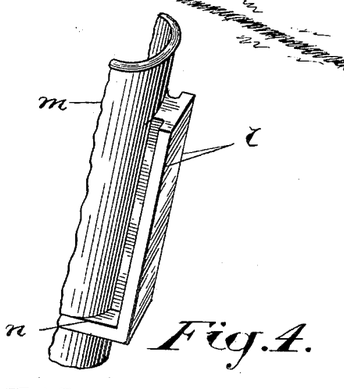
Fig. 4 is an enlarged perspective detail showing the ribs or flanges on the forward side of the drill-hoe.
Figure 5:
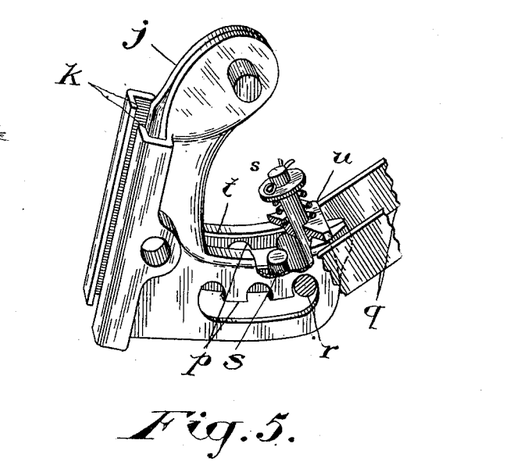
Fig. 5 is a perspective view, partially broken away, of the divided quadrant-plate, showing the lower ends of the braces connected thereto.
Figures 7, 8, 9, 10:
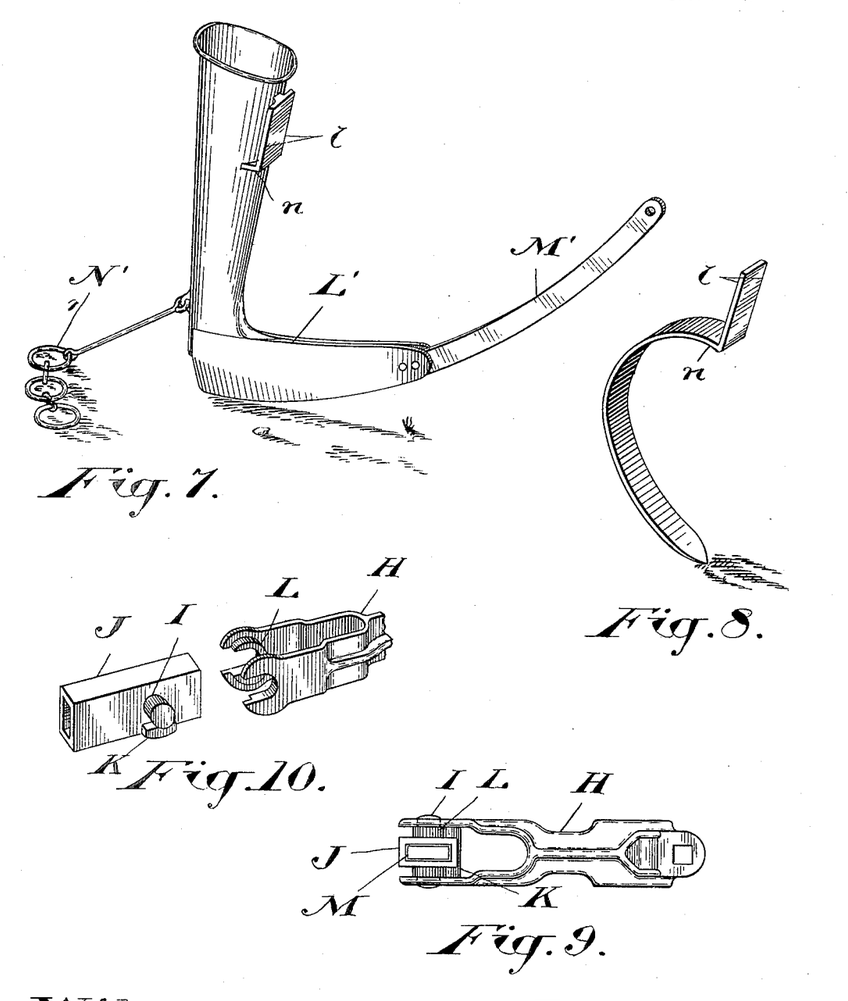
Fig. 7 is a perspective view of a drill-shoe, with grain tube and brace, as it appears detached from a drag-bar.
Fig. 8 is a perspective view of a spring cultivator-tooth.
Fig. 9 is a plan view of a lifting-arm and slipper.
Fig. 10 is a perspective detail showing the method of connecting the same.

In Figs. 1 and 2 the general construction of the machine is shown. In these views, A is the axle of the machine, suitably supported upon the angle-bar frame B, shaped as shown. C are the hopper-supports, suitably connected to the angle-bar frame B. Rigidly connected to each of these hopper-supports, above the axle, is the angle-truss bar D. Projecting upwardly and outwardly from this angle-truss are the brackets E, upon which are journaled the arms F, rigidly secured to the square shaft G. Adjustably clamped to this shaft are the lifting-arms H, corresponding in number to the number of drag-bars used in the machine. The outer end of each lifting-arm H is forked, as shown in Figs. 9 and 10, and each part of the fork is gapped to receive the trunnions I, formed upon the slipper J. Behind the trunnions is formed a lug or lugs K, adapted to engage the shoulders L, formed about the gaps in the forks. These shoulders are preferably formed on an arc of a circle struck from the center of the trunnion, but the essential part of the shoulder is that immediately behind the gap. The slipper is inserted in the lifting-arm by bringing them together in the position shown in Fig. 10. When the trunnions have reached the bottoms of the gaps, the parts may be turned into the position shown in Fig. 9, when the two will be found to be securely held together as long as they remain in operative position. Adapted to slide in each slipper J is a spring-bar M, through the upper end of which is inserted a pin N. The lower end of the spring-bar is hooked to engage an eye O, formed on or connected to one of the drag-bars P, as hereinafter described. Q is a spring surrounding the spring-bar M and bearing at its lower end against a pin and washer R. A loose washer S is preferably placed over its upper end. T and U are two square shafts having their ends rounded and journaled within the bearing-pieces V upon each end of the angle-bar frame V. (See Fig. 2.) Adjustably clamped to these shafts are the downwardly-extending arms W. The forked ends of the drag-bars are pivotally connected with these arms, the drag-bars being connected to arms extending from each shaft alternately. X X are gear-segments connected to the said shaft and meshing together, as shown in Fig. 1. $a$ is an arm extending upwardly from the shaft U, either independent of or integral with the segment-gear X. To this arm is pivotally connected one end of the connecting-link $b$, the other end of which is pivotally connected to the arm $c$ connected to the lever $d$. This lever $d$ is pivoted below the axle upon the notched quadrant $e$, which is rigidly secured to the axle and to the angle-truss D. The lever is of course provided with the usual means of engagement with the notched quadrant. By operating this lever it is evident that the shafts T and U may be rocked and the drag-bars zigzagged or placed in line, as may be desired. By pivoting the lever as shown and extending the arm $c$ upwardly therefrom I am enabled to place the lever at the back of the machine, where it may be most conveniently operated. $f$ is an arm extending outwardly from the shaft G. To the outer end of this arm is pivotally connected the connecting-rod $g$, the lower end of which is pivotally connected with the end of the bent lever $h$, which is pivoted upon the axle A. $i$ is the notched quadrant for this lever, which is rigidly secured to the axle and the angle-truss, the lever $h$ being provided with the usual means of engagement with its notches. By operating the lever $h$ the slippers J may be brought in contact with the pins N on the spring-bars M and the drag-bars thus lifted. By operating the lever $h$ in the reverse direction the slippers may be brought in contact with the springs Q and pressure thus applied to the drag-bars. As the slippers are journaled on axes intersecting their central lines, there is no twisting strain upon them to cause friction and wear, making them easy and effective in operation. The method of supporting the lifting-arms upon a square bar carried by arms journaled on brackets connected to the frame of the machine results in considerable economy of material and of weight.

On reference to Figs. 3, 4, 5, 6, 7, and 8 the construction of the drag-bars, the drill-hoes, drill, shoes, and spring-teeth will be readily understood. The drag-bars P are of the usual double construction with forked ends. Journaled between the rear end of each drag-bar is a divided quadrant-plate $j$, in the parts of which are formed grooves $k$, adapted to embrace the ribs or flanges $l$, formed upon the front side of the drill-hoe $m$. $n$ is a shoulder or stop formed at the bottom of the ribs $l$, against which the divided quadrant-plate rests when clamped in position by the pinch-bolt $o$, connecting the parts. The lower part of the divided quadrant-plate is recessed and has notched slots $p$ formed in its sides, the centers of the notches being on the arc of a circle struck from the pivot-point of the quadrant-plate. $q$ are the braces, connected at their lower ends by the bolt $r$, which is adapted to fit the notches of the slots $p$. $s$ is a hook-ended bolt engaging the bolt $r$ and extending upwardly through the slot $t$, formed between the parts of the quadrant-plate. $u$ is a sliding washer on the stem of the hook-ended bolt $s$, resting on the quadrant-plate on each side of the slot $t$. A spring upon the stem of the hook engages this washer and a suitable pin or washer upon the upper end of the hook, thus tending to retain the bolt $r$ in whichever of the notches it may be engaged with. This construction affords ready means for altering the angle of the drill-hoes. A' is a locking-lever journaled within the drag-bar. Its lower end is forked and provided with a stud B', which is embraced by the rear end of the plunger C'. The other end of this plunger works through a slot in the plunger-guide D', suitably secured to the drag-bar. Upon the upper side of this plunger-guide is formed the eye O previously referred to. Upon the lower side of this plunger-guide is formed the jaw E', to which a shoe-drill brace may be connected, as hereinafter described. F' is a spring upon the plunger, acting on the plunger-guide and a pin or washer upon the plunger, thus tending to maintain the locking-lever in its normal position. G' is a hole or notch formed in the plunger. The upper end of the locking-lever A' has a square gap formed in its under side to embrace the square central portion of the adjusting-stud H'. The ends of this stud have square cheeks I' formed thereon, adapted to rest upon the sides of the drag-bar P. Upon the ends of the studs outside these cheeks are formed the eccentric studs J', upon which are pivoted the upper ends of the braces q. Upon one side of each stud J' is formed a lip K', which while permitting the braces to be engaged with the studs retain them securely in position when the braces are properly connected at their lower ends. From this construction it is evident that by withdrawing the adjusting-stud from the gap in the locking-lever and engaging it therewith in a new position the studs J' may be changed in position relative to a plane extending through the pivot-points of the locking lever and the pivotal connection of the braces with the quadrant-plate. By thus lifting the pivot-points of the braces to the locking-lever the resistance which the drill-hoe presents to an obstruction before swinging backward may be very nicely and accurately adjusted without shifting the position of the locking-lever or varying the tension of the spring. The essential point of the construction of the adjusting-stud is that the studs upon which the braces are pivoted be eccentric to the axis of the stud and that the stud be engageable by the end of the locking-lever in two or more different positions. When it is desired to alter the adjustment, the drill-hoe is swung backward till the plunger has been forced sufficiently through the plunger-guide to enable a pin to be passed through the above-mentioned hole G' therein in front of the plunger-guide. The parts are thus retained in position with the end of the locking-lever raised, while the adjusting-stud is disengaged from the gap in the locking-lever and inserted therein in a new position. The pin may then be removed and the parts allowed to resume their normal position.

It is evident that a spring-tooth, such as shown in Fig. 8, may be connected with the divided quadrant-plate j, its upper end being shaped to form an equivalent of the ribs l and the shoulders n. A drill-shoe L', such as shown in Fig. 7, may also be connected to the drag-bar P, being in every respect an equivalent for the drill-hoe m, except in the nature of the work for which it is intended and the necessary addition of the forward brace M'. The drill-shoe is provided with ribs or flanges l on the front side of its grain-tube, such as are used upon the drill-hoe, by means of which it is connected with the quadrant-plate j. The brace M' is connected by a bolt with the jaw E' previously described. When a drill-shoe is used, it is necessary to provide a covering-chain N', as shown in Fig. 7.

From the construction described it will be seen that my drag-bars may be used with either a drill-hoe, a spring cultivator-tooth, or a shoe-drill, as may be desired by the user to suit the particular class of work upon which he may be engaged. This interchangeability is an important feature of my machine and adds largely to its value.

Figures 11, 13, 14:
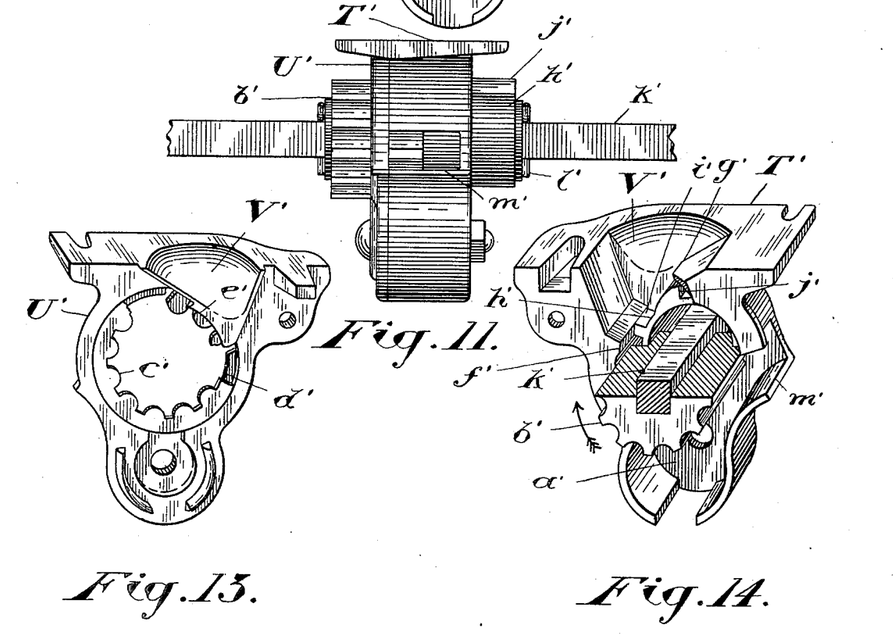
Fig. 11 is a rear elevation of a grass-seed distributer in its cup.
Fig. 13 is a perspective view of the side with the feed-roll ring in position and partly broken away.
Fig. 14 is a perspective view of the same with the side removed and the feed-roll shown in section.
Figure 12:
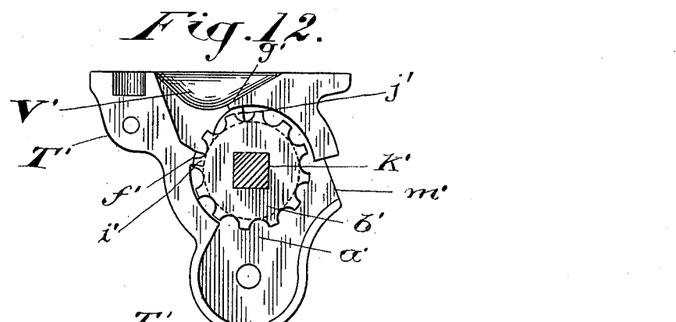
Fig. 12 is an elevation of the same with one side removed.

Carried by the hopper-support O are the hopper ends O' of the hopper P'. The hopper is divided by a partition Q' to form grain and fertilizer receptacles, and to its rear side is connected the grass-seed receptacle R'. Below openings formed in this grass-seed receptacle are situated the grass-seed distributers S'. (Shown in detail in Figs. 11, 12, 13, and 14.) Each distributer comprises a casing T' and a side U', forming between them a cup V', a discharge-opening a', and a recess for the grooved feed-roll b'. c' is a feed-roll ring or rosette set within an opening formed in the side U' and resting against the flange d'. This feed-roll ring is grooved or notched to fit the feed-roll b'. At the bottom portion of the cup formed in the side U' is a downwardly-projecting lip e', extending the full width of the cup over the upper edge of the feed-roll ring. This lip effectually prevents any grass-seed getting between the feed-roll ring and the flange d' and thus becoming ground up and destroyed. f' is a lip extending from end to end of the bottom of the cup and set close to the feed-roll, so as to prevent seed passing down between the feed-roll and the casing. g' is a lip extending from end to end of the bottom of the cup immediately above the feed-roll, sufficient space being left between the lip and the feed-roll to prevent the cutting of seed. This lip extends substantially to or beyond a vertical plane through the axis of the feed-roll. h' is a sleeve or follower engaging the inner end of the feed-roll, as shown in Fig. 14, and provided with the ribs i' j'. This sleeve extends through an opening in the end of the cup and is loose upon the shaft k', to which the feed-roll is rigidly attached. l' is a pin passed through the shaft behind the sleeve, so as to hold it in engagement with the feed-roll. The edges of the opening in the cup are notched to receive the ribs i' j', the former of which fits closely against the lip f', while the latter passes underneath the lip g'. The back of the rib j' is sloped down to the body of the sleeve, so as to render it impossible for any shearing action on the seed to be set up between it and the edges of the grooves in the feed-roll. Behind the feed-roll the casing is turned outwardly and a sight-opening m' formed therein, through which the action of the distributer may be watched.

When the grass-seed distributer is in use, the shaft k' is revolved in the direction indicated by arrow in Fig. 14. The seed is thus lifted by the grooves in the feed-roll and carried under the lip g', so that only such seed is carried to the discharge-opening as is held by the grooves in the roller. A positive feed is thus given, as there is no possibility of surplus seed flowing between the feed-roll and the lip e'. In grass-seed distributers in which the feed-roll moves down toward the discharge-opening a certain amount of space must be left between the roller and the casing to avoid cutting the seed, and this leaves room for variations in the quantity of seed sown. I entirely avoid this by the reversal of the motion and the improved construction above described. The parts of the grass-distributer may be secured together in any suitable manner. The regulation of the quantity of grass-seed sown is effected in the usual manner by longitudinally moving the shaft $k'$, thus moving the feed-rolls and sleeves within the cups. The method of driving and adjusting this shaft will be hereinafter more particularly described.

Figures 15, 16, 17, 18:
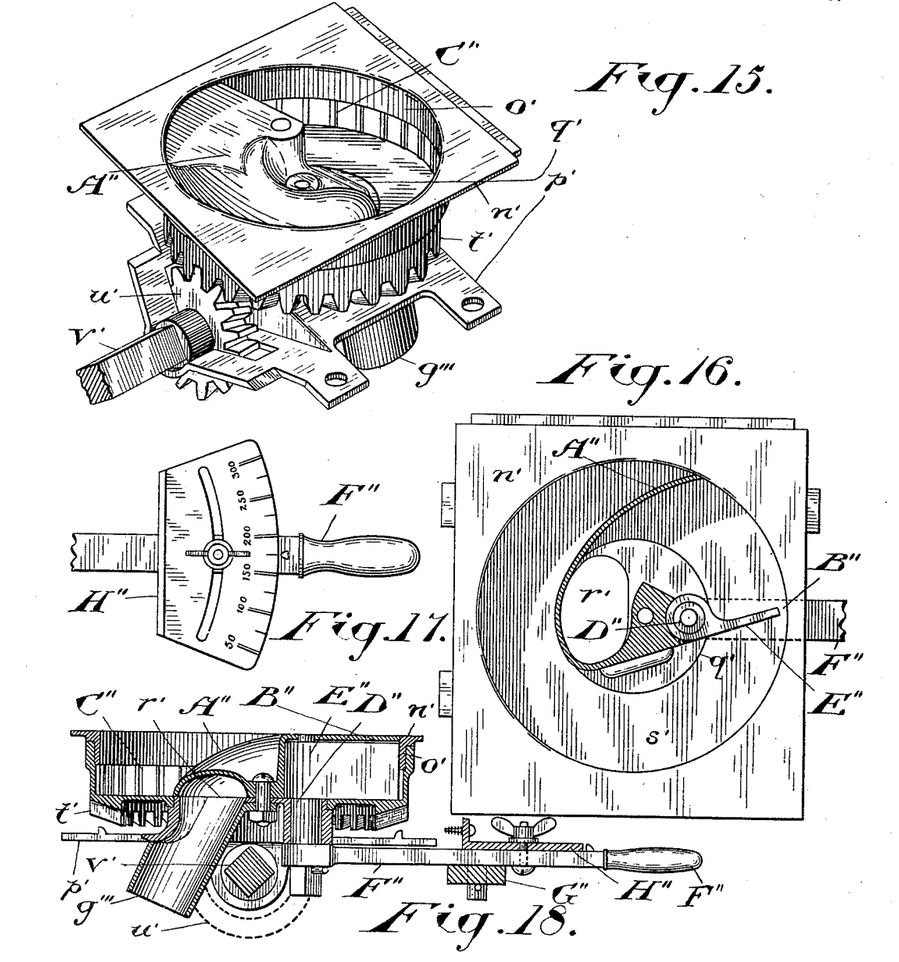
Fig. 15 is a perspective view of a fertilizer-distributer.
Fig. 16 is a plan view of the same, with the shell shown in section.
Fig. 17 is a plan view of a regulating-lever and index-plate, completing Fig. 16.
Fig. 18 is a cross-section of a fertilizer-distributer at right angles to the operating-shaft.

In Figs. 15, 16, 17, and 18 a fertilizer-distributer is more particularly shown. $n'$ is a plate which may be suitably secured in an opening in the bottom of the fertilizer-receptacle. $o'$ is a downwardly-depending ring secured thereto or formed therewith. $p'$ is a plate suitably secured to the hopper, and $q'$ is a circular platform supported thereby and having a discharge-opening $r'$ formed therein. $s'$ is a feed-cup rotatable upon the said platform and having the upper surface of its bottom substantially on a level with the upper surface of the platform. The ring $o'$ extends downwardly within the upper portion of the feed-cup, which is preferably stepped to receive it, as shown. On the under side of the feed-cup is formed the bevel-gear $t'$, which meshes with the bevel-pinion $u'$, fast upon the shaft $v'$, journaled in the frame $p'$. The method of driving this shaft will be hereinafter fully described. $A''$ is a shell or guard shaped substantially as shown and adapted to cover the discharge-opening $r'$ in the circular platform. This shell is secured to the platform $q'$ and extends outwardly to the edge of the feed-cup and rises nearly to the top of the ring $o'$. This shell is provided with a vertical opening $B''$, through which fertilizing material may be carried by the rotation of the feed-cup, to be discharged through the opening $r'$. To facilitate the movement of the fertilizing material, I prefer to form ribs $C''$ upon the rim of the feed-cup, as shown in Figs. 15 and 18. $D''$ is a stem journaled in the circular platform $q'$ and extending upwardly to the top of the shell $A''$. To this stem is secured the gate $E''$, which is adapted to regulate the size of the opening $B''$. (See Figs. 16 and 18.) To the lower end of this stem is secured a lever $F''$, by moving which the position of the gate may be altered as required. Each fertilizer-distributer is provided with one of these levers, and each lever is pivoted upon a connecting-rod $G''$. One of the levers is extended outwardly, as shown in Fig. 18, and is provided with means by which it may be clamped upon an index-plate $H''$ in any desired position. This plate is graduated to indicate the quantity of fertilizer being used and may be rigidly secured to any suitable portion of the frame of the machine.

From the above description it will be seen that with my fertilizer-distributer it is possible to alter the quantity of fertilizer discharged without any interchanging of parts or altering the speed of the same and that the exact quantity being discharged is properly indicated.

The construction of the grain-distributer is more specially set out in Figs. 19, 20, 21, and 22, in which $I''$ is a casing forming a cup and $J''$ a clamp secured to the back of the casing and provided with a stud upon which is journaled the circular feed-disk $K''$, the casing and the clamp forming the complete casing. $L''$ is a wing extending inwardly from the edge of the casing, forming the cup to the back of the circular feed-disk and extending upwardly close to the rim thereof. The circular feed-disk fits closely to the casing $I''$, so as to prevent the escape of grain, and an opening is formed at the bottom of the cup in the casing below the wing $L''$. $M''$ is a flange upon the casing, forming the cup adjacent to the feed-wheel at its lower part and forming at $N''$ the mouth of the distributer. $O''$ is a gear-wheel formed on or connected to the back of the circular feed-disk. With this gear-wheel meshes a pinion $P''$, fast upon the shaft $Q''$, journaled within a bearing formed upon the clamp $J''$. Suitable mechanism is provided, as hereinafter described, for revolving this shaft, so as to rotate the circular feed-disk in the direction indicated by arrow in Fig. 19, and the feed-disk is so operated that the grain passing down through the hopper passes through the opening at the bottom thereof and is lifted by the feed-disk and discharged at the mouth $N''$. To facilitate the lifting and discharge of the grain, I prefer to provide a series of ribs $R''$ upon the inside of the rim of the feed-disk, these ribs having their lifting sides inclined from the back of the feed-disk toward the outer edge, as shown. It will be seen that by gearing the feed-disk to the driving-shaft instead of connecting it directly thereto I am enabled to make all three sides of my cup on such a comparatively small angle from the perpendicular that all possibility of seed sticking or failing to pass freely to the discharge is obviated, as the coarse grains pass through the hopper much more freely than when one of the sides of the hopper is flatter, as is the case when a central shaft extending through the feed-disk is used.

Figure 19:
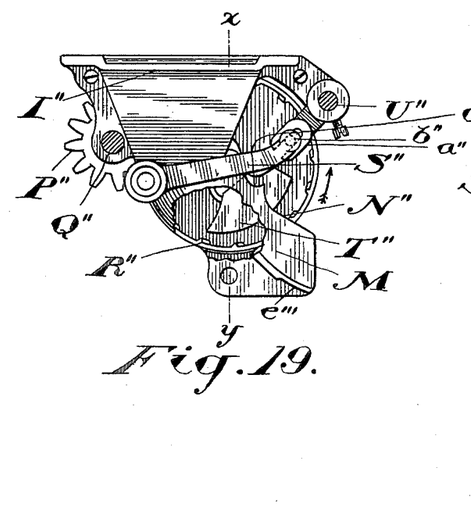
Fig. 19 is an elevation of a grain-distributer and cup from the discharge side, with the casing partly broken away.
Figure 20:
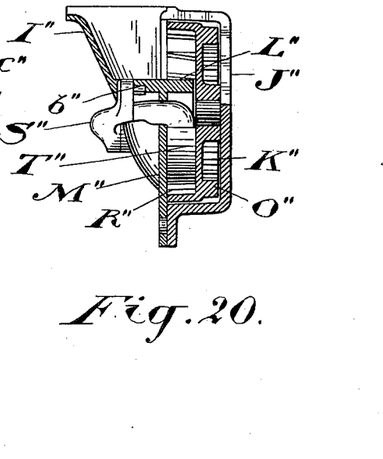
Fig. 20 is a vertical section through the line $x\ y$ in Fig. 19.
Figure 21:
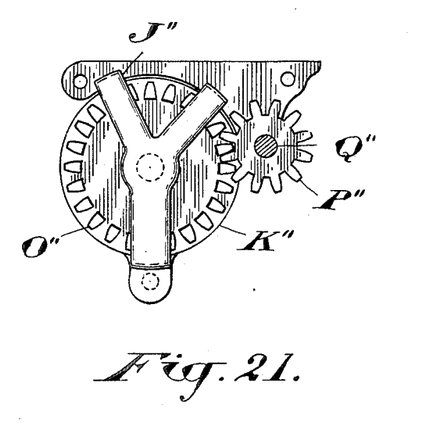
Fig. 21 is an elevation of a grain-distributer from the driving side.
Figure 22:
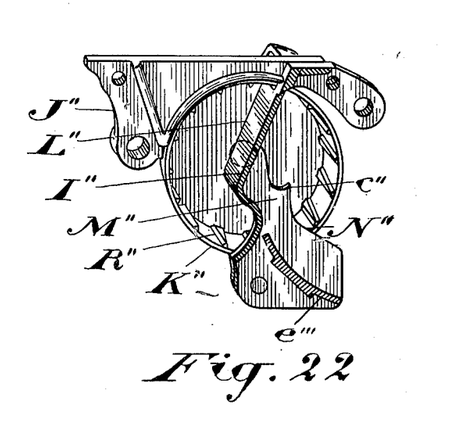
Fig. 22 is a perspective detail partly broken away, of the grain-distributer from the discharge side.
Figure 26:
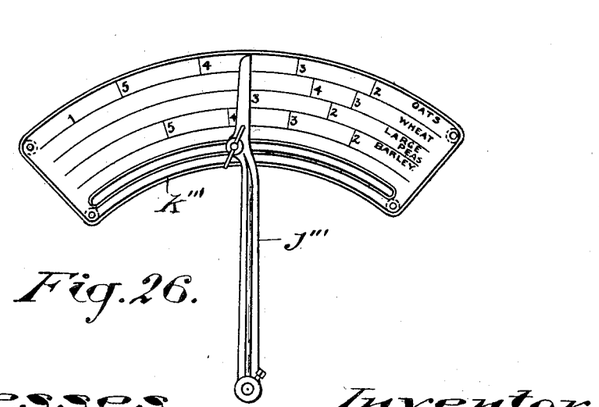
Fig. 26 is a detail in elevation of the grain-distributer index-plate, being supplemental to Fig. 23.
Figure 27:
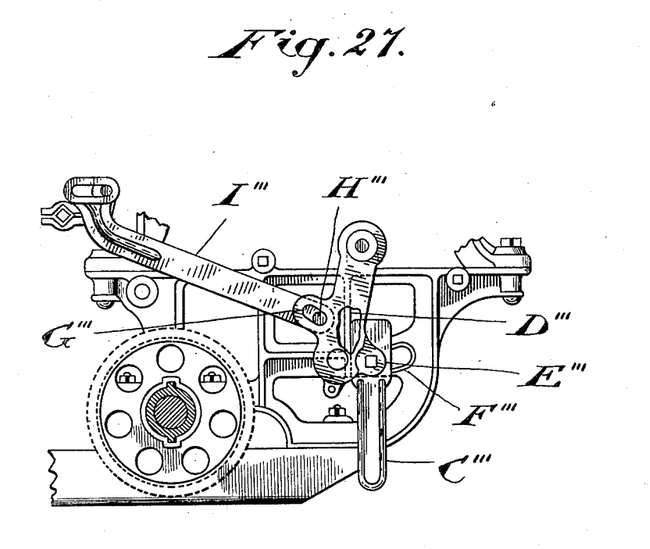
Fig. 27 is a side elevation, with part removed, of a portion of the fertilizer-distributer.
Figure 28:
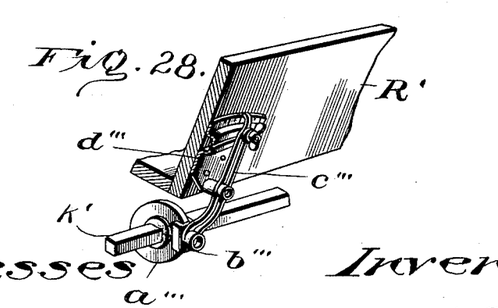
Fig 28 is an enlarged perspective detail of the parts $a'''$, $b'''$, $c'''$, and $d'''$, shown in Fig. 1.

$S''$ is an arm journaled upon the casing $I''$ and extending rearwardly and inwardly within the feed-disk $K''$. To this arm is connected the cut-off $T''$, which is adapted to close the opening at the bottom of the cup. The front side of this cut-off fits close to the bottom of the wing $L''$ and is formed on the arc of a circle struck from the pivot-point of the arm $S''$. The back of the cut-off is formed of such a curve that it is closer to the rim of the feed-disk at the cut-off point than at the mouth $N''$. It will be seen that by swinging the arm $S''$ the position of the cut-off may be so regulated as to cause the distributer to sow any desired quantity of grain. $U''$ is a shaft journaled in a bearing formed on the casing I″. Secured to this shaft by a set-screw is the forked or slotted arm $a''$, which engages a pin $b''$ upon the arm S″. By rocking this shaft the necessary motion is imparted to the cut-off T″. The shaft is of course provided with an arm for each grain-distributer in the machine. These distributers are set below openings formed in the bottom of the grain-seed receptacle. The flange M″ has a notch $c''$ formed therein, in which the inwardly-projecting portion of the arm S″ rests when the cut-off is at its lowest point, just clearing the ribs R″. It will be noticed that the arms $a''$ are secured by set-screws to the shaft U″. When it is desired to adjust the cut-offs, the set-screws are slacked and the cut-offs allowed to drop till their arms are resting in the notches $c''$. Having thus insured that they all occupy a similar position as regards the shaft U″, the set-screws are tightened, and it will then be found that all the distributers will act uniformly. The end of the shaft U″ extends through the left-hand end and is provided with an index-arm $j'''$, Fig. 26, which is provided with any suitable means whereby it may be clamped to the index-plate $k'''$ in any desired position.

Figure 23:
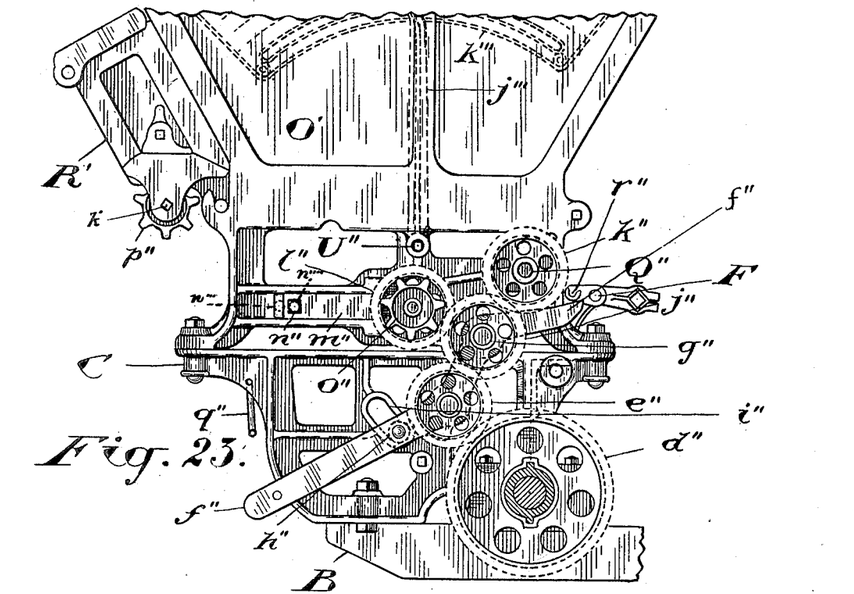
Fig. 23 is an end elevation of a part of the machine, showing the means of driving the grain-distributers and the grass-seed distributers.
Figure 24:
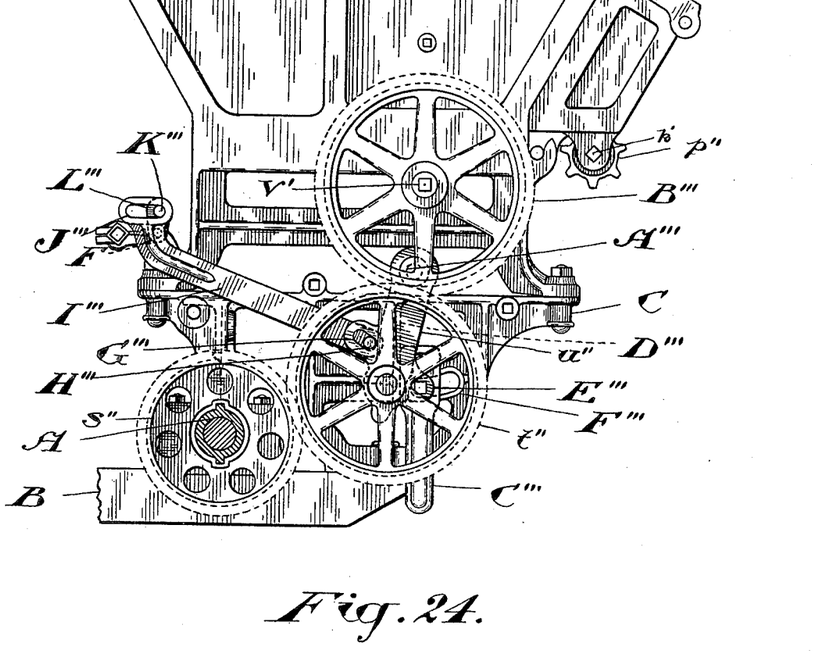
Fig. 24 is a similar view of the opposite end of the machines showing the means of driving the fertilizer-distributers.

On reference to Figs. 23 and 24 the method of operating the grass-seed distributers, fertilizer-distributers, and the grain-distributers will be seen.

In Fig. 23, $d''$ is a gear-wheel which is secured to the hub of the ground-wheel. (See Fig. 2.) This gear-wheel meshes with a gear-wheel $e''$, journaled on the lever $f''$. This lever is journaled upon the hopper-support at $g''$ and has a stud $h''$ thereon, projecting into the curved slot $i''$. The stud may be steadied within the slot by any desired means. $j''$ is a gear-wheel journaled at the same point as the lever $f''$ and meshing with gear-wheel $e''$. $k''$ is a gear-wheel fast upon the end of shaft Q″ and meshing with the gear-wheel $j''$. Thus motion is conveyed by the train of gear described from the ground-wheel to the shaft operating the grain-distributers. $l''$ is a gear-wheel journaled upon the slide $m''$, adjustable upon the hopper end by any suitable means. In the drawings two holes $n'''\ n''''$ are indicated in dotted lines in the hopper end, through either of which the bolt $n''$, passing through the slide $m''$, may be passed, so that the gear-wheel $l''$ may be held in or out of gear, as may be desired. Revolving with the gear-wheel $l''$ is a sprocket-wheel $o''$, which may be connected by a suitable sprocket-chain with the sprocket-wheel $p''$ on the grass-seed-distributer shaft. When it is desired to stop the distribution of grain and grass seed, the lever $f''$ may be raised by hand and held raised by being engaged with the hook $q''$. The upper end of the lever $f''$ is extended forward and passes below a small cam $r''$, carried by the arm F at the end of the frame of the machine. (See Fig. 2.) This arm, as has been previously described, is connected to the square shaft G. When the shaft is raised in the operation of lifting the drag-bars from the ground, the arm F is rocked and causes the cam $r''$ to press down the end of the lever $f''$, thus throwing the gear-wheel $e''$ out of mesh with the hub-gear $d''$, stopping the discharge of grain and grass seed. The grass-seed-distributer shaft $k'$ must be made longitudinally movable in its bearings, as by the longitudinal movements of the shaft the quantity of seed sown by the distributers is regulated. Upon the shaft I preferably form a collar $a'''$, which engages with a slot (shown in dotted lines in Fig. 1) formed in the block $b'''$, pivotally connected to the lower end of the index-arm $c'''$, which arm is pivoted upon the index-plate $d'''$ and is provided with any suitable means by which it may be clamped to the index-plate in any desired position.

In Fig. 24, $s''$ is a hub-gear similar to the gear $d''$. $t''$ is an intermediate gear journaled upon the lever $u''$, journaled at $A'''$ upon the hopper-support C at the left-hand side of the machine. $B'''$ is a gear-wheel fast upon the end of the fertilizer-distributer shaft $v'$ and meshing with the intermediate gear $t''$. By this train of gear the motion is imparted from the ground-wheel to the fertilizer-distributers. $C'''$ is a cam-lever pivoted behind the lever $u''$ and lying in contact with the rib $D'''$ on the hopper-support. (Shown in dotted lines in Fig. 24.) By swinging this lever $C'''$ so that the end comes in contact with the rib $D'''$ the intermediate gear $t''$ will be swung out of mesh with the hub-gear $s''$ and the distribution of the fertilizer immediately stopped. $E'''$ is a stud formed upon the lever $u''$, which extends within the curved slot $F''''$ and is held steady therein by any suitable means. $G'''$ is a slot formed in a forward extension of the lever $u''$. With this slot engages a pin $H'''$ upon the connecting-bar $I'''$. The other end of this bar has a slot $J'''$ formed therein, with which engages a crank-pin $K'''$ upon the arm $L'''$, connected to the arm F at the left-hand side of the machine. As all the arms F operate simultaneously, as previously described, when the drill-hoes are lifted from the ground the fertilizer-distributer will be stopped as well as the grain and grass-seed distributers. This is effected by the crank-pin $K'''$ coming in contact with the end of the slot $L'''$, so that the lever $u''$ is swung to throw the intermediate gear $t''$ out of mesh with the hub-gear $s''$. The slots are necessary for the purpose of allowing the intermediate gear to be swung out of mesh by hand, as previously described. The slots also permit of the rocking of the arm $L'''$ when the machine is being used as a cultivator and the cultivator-teeth are being lifted and dropped.

On reference to Figs. 1 and 19, a flange $e'''$ will be seen formed upon the casing of each grain-distributer. To this flange is bolted a conveyer $f''''$, which is so shaped as to receive the grain coming from the mouth N″ of the grain-distributer and the fertilizer passing from the spout $g'''$ below the discharge-opening in the fertilizer-distributer. The lower ends of these conveyers are provided with pins, upon which are supported the upper ends of the conductor-spouts $h'''$, which convey the mixed grain and fertilizer to the drill-hoes or grain-tubes of the shoes. (See Fig. 1.)

Figure 25:
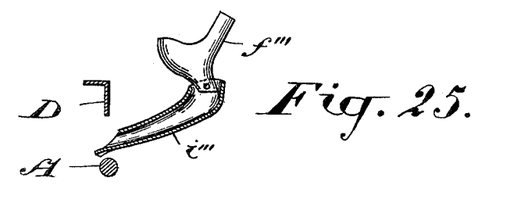
Fig. 25 is a detail showing a scatter-spout for use in broadcast sowing.

When it is desired to sow broadcast, the conductor-spouts are removed and a spring cultivator-tooth substituted for the drill-hoes. Then to the lower ends of the conveyers $f'''$ I attach in any suitable manner scatter-spouts, such as $i'''$. (Shown in Fig. 25, which illustrates the relative position of the angle-truss, the axle, and the conveyer $f'''$.) It will be seen that the scatter-spouts are extended forward to discharge in front of the axle.

What I claim as my invention is—

1. In a seeding-machine in which independent drag-bars are used, a drag-bar; a divided quadrant-plate pivoted to the drag-bars; and locking mechanism connecting the quadrant-plate with the drag-bars, in combination with a drill-hoe; ribs or flanges formed on its front side and adapted to fit into grooves formed in the parts of the quadrant-plate; and a pinch-bolt passing through the said parts and adapted to clamp them on the aforesaid ribs or flanges, substantially as and for the purpose specified.

2. In a seeding-machine in which independent drag-bars are used, a drag-bar; a divided quadrant-plate supported by the drag-bar, in combination with a drill-hoe; ribs or flanges formed on its front side and adapted to fit into grooves formed in the parts of the quadrant-plate; and a pinch-bolt passing through the said parts and adapted to clamp them on the aforesaid ribs or flanges, substantially as and for the purpose specified.

3. In a seeding-machine in which independent drag-bars are used, a drag-bar; a divided quadrant-plate supported by the drag-bar, in combination with a drill-shoe; ribs or flanges formed on the front side of the grain-tube of the shoe, and adapted to fit into grooves formed in the parts of the quadrant-plate; a pinch-bolt passing through the said parts and adapted to clamp them on the aforesaid ribs or flanges; a brace extending forward from the front of the shoe; and a detachable connection between the front of the brace and the drag-bar, substantially as and for the purpose specified.

4. In a seeding-machine in which independent drag-bars are used, a drag-bar; a quadrant-plate supported by the drag-bars, in combination with a drill-shoe, the grain-tube of which is detachably connected to the said quadrant-plate; a brace extending forward from the front of the shoe; and a detachable connection between the front of the brace and the drag-bars, substantially as and for the purpose specified.

5. In a seeding-machine in which independent drag-bars are used, a drag-bar, in combination with a drill-shoe, the grain-tube of which is detachably connected to the rear of the said drag-bars; a brace extending forward from the front of the shoe; and a detachable connection between the front of the brace and the forward part of the drag-bar, substantially as and for the purpose specified.

6. In a seeding-machine in which independent drag-bars are used, a drag-bar, a quadrant-plate pivoted thereto, and having a notched slot formed therein, the centers of the notches being on the arc of a circle struck from the pivot-point, in combination with braces having their lower ends connected by a bolt adapted to enter the said notches; locking mechanism to which the other ends of the said braces are pivoted; a hook embracing the bolt connecting the braces, and extending up through a slot in the quadrant-plate; and a spring arranged to act upon the said hook to retain the brace-bolt in any of the notches desired, substantially as and for the purpose specified.

7. In a seeding-machine in which independent drag-bars are used, a drag-bar; a quadrant-plate pivoted thereto, and braces pivotally connected to the said plate, in combination with a locking-lever pivoted within the drag-bar and having a rectangular gap formed in the under side of its forward end; an adjusting-bolt having its central portion square in section so as to fit the said gap in any position; square cheeks formed on the bolt and adapted to rest on the drag-bars; eccentric studs on the ends of the bolt upon which the braces are pivoted; and a spring acting on the drag-bars and locking-lever tending to retain the latter in its normal position, substantially as and for the purpose specified.

8. In a seeding-machine in which independent drag-bars are used, a drag-bar; a quadrant-plate pivoted thereto, and braces pivotally connected to the said plate, in combination with a locking-lever pivoted within the drag-bar and having a rectangular gap formed in the under side of its forward end; an adjusting-bolt having its central portion square in section so as to fit the said gap in any position; square cheeks formed on the bolt and adapted to rest on the drag-bar; eccentric studs on the ends of the bolt upon which the braces are pivoted; a plunger pivotally connected to the lower end of the locking-lever, and having a notch or hole near its forward end; a plunger-guide secured to the drag-bar and slotted for the passage of the plunger; and a spring acting against the said plunger-guide, and a pin or washer on the plunger, substantially as and for the purpose specified.

9. In a seeding-machine in which independent drag-bars are used, a drag-bar; a quadrant-plate pivoted thereto; and braces pivotally connected to the said plate, in combination with a locking-lever pivoted within the drag-bar; an adjusting-bolt adapted to engage the end of the locking-lever in two or more positions; eccentric studs on the ends of the bolt upon which the braces are pivoted; and a spring acting on the drag-bar and locking-lever tending to retain the latter in its normal position, substantially as and for the purpose specified.

10. In a seeding-machine in which independent drag-bars are used, a drag-bar; a quadrant-plate pivoted thereto; and braces pivotally connected to the said plate, in combination with a locking-lever pivoted within the drag-bar; an adjusting-bolt adapted to engage the end of the locking-lever in two or more positions; eccentric studs on the ends of the bolt upon which the braces are pivoted; lips formed on one side of the outer end of each stud to retain the braces in position; and a spring acting on the drag-bar and locking-lever tending to retain the latter in its normal position, substantially as and for the purpose specified.

11. In a seeding-machine in which independent drag-bars are used, a drag-bar; a quadrant-plate pivoted thereto; and braces pivotally connected to the said plate, in combination with a locking-lever pivoted within the drag-bar, and having the braces pivoted to its upper end; means for shifting the relative position of the pivots of the braces and the locking-lever; a plunger pivotally connected to the lower end of the locking-lever; a plunger-guide connected to the drag-bars and slotted for the passage of the plunger; and a spring acting against the said plunger-guide and a pin or washer on the plunger, the plunger having a notch or hole formed therein through which a pin may be passed to engage the forward side of the plunger-guide to maintain the spring in compression while the relative position of the aforesaid centers is being changed, substantially as and for the purpose specified.

12. In a seeding-machine in which independent drag-bars are used, a series of drag-bars pivotally connected with the forward part of the frame of the machine; a vertical bar pivoted to each drag-bar; a slipper on each vertical bar; a pin through the upper end of each vertical bar, in combination with two or more arms pivoted on the frame of the machine above the drag-bars; a shaft rigidly secured to the said arms; a series of arms corresponding in number to the drag-bars rigidly secured to the said shaft, and each pivotally connected to a slipper, and means for adjusting the height of the said shaft, substantially as and for the purpose specified.

13. In a seeding-machine in which independent drag-bars are used, a drag-bar pivotally connected with the forward part of the machine; a vertical bar pivoted to the drag-bar; a slipper sliding on the said vertical bar; trunnions on the said slipper, the center line of which intersects the vertical axes of the slipper; a swinging arm in which the said trunnions are journaled and means for swinging and adjusting the said arm, substantially as and for the purpose specified.

14. In a seeding-machine in which independent drag-bars are used, a drag-bar pivotally connected with the forward part of the machine; a vertical bar pivoted to the drag-bar; a slipper sliding on the said vertical bar; trunnions on the said slipper, the center line of which intersects the vertical axis of the slipper; lugs on the slipper behind the trunnion; an arm with jaws formed at the end, the jaws being gapped to receive the trunnions; shoulders formed at the back of each gap to engage the lugs on the slipper when the latter is in working position, and means for swinging and adjusting the said arm, substantially as and for the purpose specified.

15. In a seeding-machine in which independent drag-bars are used, a series of drag-bars; two shafts journaled in the frame of the machine; a series of arms extending from each shaft to which alternate drag-bars are pivotally connected; segment-gears connected to the said shafts and meshing with one another; an arm extending from one of the shafts; a connecting-rod pivoted at one end to the said arm; a notched quadrant rigidly supported by the axle of the machine; a hand-lever pivoted on the said quadrant below the level of the axle; and an arm extending upwardly from the lever to which the other end of the said connecting-rod is pivoted, substantially as and for the purpose specified.

16. In a seeding-machine in which independent drag-bars are used, a series of drag-bars; two shafts journaled in the frame of the machine; a series of arms extending from each shaft to which alternate drag-bars are pivotally connected; segment-gears connected to the said shafts and meshing with one another; an arm extending from one of the shafts; a connecting-rod pivoted at one end to the said arm; a bar extending from end to end of the frame of the machine above the axle; a notched quadrant rigidly secured to the axle and the said bar; a hand-lever pivoted on the said quadrant below the level of the axle; and an arm extending upwardly from the lever to which the other end of the said connecting-rod is pivoted, substantially as and for the purpose specified.

17. In a seeding-machine a grass-seed distributer comprising a casing and a grooved feed-roll journaled therein and fitted so that no seed can escape at the ends of the roll, the casing forming a cup extending down to the feed-roll and provided at one side of its lower end with a lip closely fitting the side of the roll, and at its other side with an easy-fitting lip extending substantially to or beyond a vertical plane through the axis of the feed-roll, the casing being also provided with a discharge-opening extending up to the under side of the feed-roll, in combination with a shaft fast to the feed-roll, and which may be driven to revolve the feed-roll toward the upper lip of the cup, substantially as and for the purpose specified.

18. In a seeding-machine a grass-seed distributer comprising a casing; and a grooved feed-roll journaled therein, and fitted so that no seed can escape at the ends of the roll, the casing forming a cup extending down to the feed-roll substantially to one side of a vertical plane through the axis of the feed-roll, the casing being also provided with a discharge-opening extending up to the under side of the feed-roll, in combination with a shaft fast to the feed-roll and which may be driven to revolve the feed-roll toward the upper lip of the cup, substantially as and for the purpose specified.

19. In a seeding-machine and in the grass-seed distributer thereof, a casing and a side therefor forming between them a cup, in combination with a flange formed about the outer edge of an opening in the side below the cup; a feed-roll ring set within the opening and resting against the said flange; and a downwardly-projecting lip formed on the cover at the bottom of the cup and extending the full width of the same over the upper edge of the said ring, substantially as and for the purpose specified.

20. In a seeding-machine and in the grass-seed distributer thereof, a casing and a side therefor forming between them a cup and a discharge-opening, in combination with a grooved feed-roll ring surrounding an opening in the side below the cup; a grooved feed-roll set within a suitable recess into which open the cup and discharge-opening, and adapted to slide in the said ring; a sleeve engaging the inner end of the feed-roll and extending through a closely-fitting opening in the casing; a shaft to which the feed-roll is secured; a pin through the shaft behind the sleeve; a rib upon the sleeve fitting a notch in the opening in the casing and lying close to the lower edge of the bottom of the cup; and a rib upon the sleeve fitting a notch in the opening in the casing and extending below the upper edge of the bottom of the cup, its back being sloped down to the body of the sleeve, substantially as and for the purpose specified.

21. In a seeding-machine a grass-seed distributer comprising a casing, and a grooved feed-roll journaled therein and fitted so that no seed can escape at the ends of the roll, the casing forming a cup extending down to the feed-roll substantially to one side of a vertical plane through the axis of the feed-roll, the casing being also provided with a discharge-opening extending up to the under side of the feed-roll, and a sight-opening behind the feed-roll in an outwardly-projecting portion of the casing, in combination with a shaft fast to the feed-roll which may be driven to revolve the feed-roll toward the upper lip of the cup, substantially as and for the purpose specified.

22. In a seeding-machine and in the grass-seed distributer thereof, a casing and a cover therefor, forming between them a cup and a discharge-opening, in combination with a grooved feed-roll ring surrounding an opening in the cover below the cup; a grooved feed-roll adapted to slide within the said ring and set within a suitable recess into which open the cup and discharge-opening; a sleeve engaging the inner end of the feed-roll and extending through a closely-fitting hole in the casing; a shaft to which the feed-roll is secured; a pin through the shaft behind the sleeve; a lip at the bottom of the cup fitting closely the forward side of the feed-roll; an easy-fitting lip at the upper portion of the bottom of the cup extending substantially to or beyond a vertical plane through the axis of the feed-roll; a rib upon the aforesaid sleeve fitting a notch in the opening in the casing and lying close to the lip at the lower edge of the bottom of the cup; and a rib upon the sleeve fitting a notch in the opening in the casing and extending below the lip at the upper edge of the bottom of the cup, its back being sloped down to the body of the sleeve, substantially as and for the purpose specified.

23. In a seeding-machine a fertilizer-distributer comprising a frame and a circular platform supported thereby and having a discharge-opening formed therein, in combination with a feed-cup rotatable upon the said platform and having the upper surface of its bottom substantially on a level with the upper surface of the platform; a stationary ring within the upper part of the feed-cup; a frame secured to the said ring; a shell covering the said opening in the platform and having a vertical opening therein extending to the edge of the feed-cup; a stem extending upward through the said platform; a gate secured to the said stem and adapted to regulate the size of the aforesaid opening; and means for adjusting the position of the said stem, substantially as and for the purpose specified.

24. In a seeding-machine a fertilizer-distributer comprising a frame and a circular platform supported thereby and having a discharge-opening formed therein, in combination with a feed-cup rotatable upon the said platform and having the upper surface of its bottom substantially on a level with the upper surface of the platform; a stationary ring within the upper part of the feed-cup; a frame secured to the said ring; ribs upon the inside of the feed-cup; a shell covering the said opening in the platform and having a vertical opening therein extending to the edge of the feed-cup; a stem extending upward through the said platform; a gate secured to the said stem and adapted to regulate the size of the aforesaid opening; and means for adjusting the position of the said stem, substantially as and for the purpose specified.

25. In a seeding-machine a fertilizer-distributer comprising a frame and a circular platform supported thereby and having a discharge-opening formed therein, in combination with a feed-cup rotatable upon the said platform and having the upper surface of its bottom substantially on a level with the upper surface of the platform; a stationary ring within the upper part of the feed-cup; a frame secured to the said ring; ribs upon the inside of the feed-cup; and a shell covering the said opening in the platform and having a vertical opening therein extending to the edge of the feed-cup, substantially as and for the purpose specified.

26. In a seeding-machine a series of fertilizer-distributers each comprising a frame and a circular platform supported thereby and having a discharge-opening formed therein, in combination with a feed-cup rotatable upon the said platform and having the upper surface of its bottom substantially on a level with the upper surface of the platform; a stationary ring within the upper part of the feed-cup; a frame secured to the said ring; a shell covering the said opening in the platform and having a vertical opening therein extending to the edge of the feed-cup; a stem extending upward through the said platform; a gate secured to the said stem and adapted to regulate the size of the aforesaid opening; a lever rigidly connected to each stem; a connecting-rod pivotally connected to all the levers; a graduated index-plate connected to the frame of the machine above one of the levers and means for clamping the said lever to the index-plate in any desired position, substantially as and for the purpose specified.

27. In a seeding-machine, the combination of a grain-distributer having a casing, a circular feed-disk journaled in proximity to said casing, and a cup arranged between said casing and feed-disk, which cup is arranged to discharge into the lower part of the elevator; a flange upon the cup adjacent to the feed-disk at its lower part and forming the mouth of the distributer; a wing extending inwardly from the cup to the back of the elevator from the cup-discharge opening to the top of the inside of the rim of the feed-disk; a gear-wheel formed on or connected to the back of the feed-disk; a shaft journaled in the casing at one side of the cup and a pinion upon the shaft meshing with the said gear, substantially as and for the purpose specified.

28. In a seeding-machine, the combination of a grain-distributer having a casing, a circular feed-disk journaled in proximity to said casing, and a cup arranged between said casing and feed-disk, which cup is arranged to discharge into the lower part of the feed-disk; a flange upon the cup adjacent to the feed-disk at its lower part and forming the mouth of the distributer; a wing extending inwardly from the cup to the back of the feed-disk from the cup-discharge opening to the top of the inside of the rim of the feed-disk; a gear-wheel formed on or connected to the back of the feed-disk; a shaft journaled in the casing at one side of the cup; a pinion upon the shaft meshing with the said gear; a cut-off adapted to vary the cup-opening; an arm extending outwardly from the cut-off bent forward and pivoted upon the casing; and means for adjusting the position of the said arm, substantially as and for the purpose specified.

29. In a seeding-machine, the combination of a grain-distributer having a casing, a circular feed-disk journaled in proximity to said casing, and a cup arranged between said casing and feed-disk, which cup is arranged to discharge into the lower part of the feed-disk; a flange upon the hopper adjacent to the feed-disk at its lower part and forming the mouth of the distributer; a wing extending inwardly from the cup to the back of the feed-disk from the cup-discharge opening to the top of the inside of the rim of the feed-disk; a gear-wheel formed on or connected to the back of the feed-disk; a shaft journaled in the casing at one side of the cup; a pinion upon the shaft meshing with the said gear; an arm pivoted upon the casing and extending rearwardly and inwardly within the feed-disk; a cut-off secured to the said arm having its front side close to the bottom of the aforesaid wing and formed on an arc of a circle struck from the pivot-point of the said arm; and means for adjusting the position of the arm, substantially as and for the purpose specified.

30. In a seeding-machine, the combination of a grain-distributer having a casing, a circular feed-disk journaled in proximity to said casing, and a cup arranged between said casing and feed-disk, which cup is arranged to discharge into the lower part of the feed-disk; a flange upon the hopper adjacent to the feed-disk at its lower part and forming the mouth of the distributer; a wing extending inwardly from the cup to the back of the feed-disk from the cup-discharge opening to the top of the inside of the rim of the feed-disk; a gear-wheel formed on or connected to the back of the feed-disk; a shaft journaled in the casing at one side of the cup; a pinion upon the shaft meshing with the said gear; an arm pivoted upon the casing and extending rearwardly and inwardly within the feed-disk; a cut-off secured to the said arm having its front side close to the bottom of the aforesaid wing and formed on an arc of a circle struck from the pivot-point of the said arm and having its back always nearer to the rim of the elevator at the point of cut-off than at the point of discharge, and means for adjusting the position of the said arm, substantially as and for the purpose specified.

31. In a seeding-machine, the combination of a grain-distributer having a casing, a circular feed-disk journaled in proximity to said casing, and a cup arranged between said casing and feed-disk, which cup is arranged to discharge into the lower part of the feed-disk; a flange upon the cup adjacent to the feed-disk at its lower part and forming the mouth of the distributer; a wing extending inwardly from the cup to the back of the feed-disk from the cup-discharge opening to the top of the inside of the rim of the feed-disk; a gear-wheel formed on or connected to the back of the feed-disk; a shaft journaled in the casing at one side of the cup; a pinion upon the shaft meshing with the said gear-wheel; a cut-off adapted to vary the cup-opening; an arm extending outwardly from the cut-off bent forward and pivoted upon the casing; a pin upon the said arm; a suitably-journaled shaft; a slotted arm upon the shaft engaging with the said pin; an index-arm upon the said shaft; a graduated index-plate secured to the frame of the machine, and means for clamping the arm to the plate in any desired position, substantially as and for the purpose specified.

32. In a seeding-machine, the combination of a grain-distributer having a casing, a circular feed-disk journaled in proximity to said casing, and a cup arranged between said casing and feed-disk, which cup is arranged to discharge into the lower part of the feed-disk; a flange upon the cup adjacent to the feed-disk at its lower part and forming the mouth of the distributer; a wing extending inwardly from the cup to the back of the feed-disk from the cup-discharge opening to the top of the inside of the rim of the feed-disk; a gear-wheel formed on or connected to the back of the feed-disk; a shaft journaled in the casing at one side of the cup; a pinion upon the shaft meshing with the said gear; and ribs upon the inside of the rim of the feed-disk having their front faces inclined from the back of the feed-disk toward the outer edge to cause the grain to pass away freely toward the discharge, substantially as and for the purpose specified.

33. In a seeding-machine, the combination of a grain-distributer having a casing, a circular feed-disk journaled in proximity to said casing, and a cup arranged between said casing and feed-disk, which cup is arranged to discharge into the lower part of the feed-disk; a gear-wheel formed on or connected to the back of the feed-disk; a shaft journaled in the casing at one side of the cup and a pinion upon the shaft meshing with the said gear, substantially as and for the purpose specified.

34. In a seeding-machine, the combination of a grain-distributer having a casing, a circular feed-disk journaled in proximity to said casing, and a cup arranged between said casing and feed-disk, which cup is arranged to discharge into the lower part of the feed-disk; a flange upon the cup adjacent to the feed-disk at its lower point and forming the mouth of the distributer; a wing extending inwardly from the cup to the back of the feed-disk from the cup-discharge opening to the top of the inside of the rim of the feed-disk; ribs upon the inside of the rim of the feed-disk having their front faces inclined from the back of the feed-disk toward the outer edge to cause the grain to pass freely away toward the discharge and means for revolving the said feed-disk, substantially as and for the purpose specified.

Toronto, October 3, 1898.

JAMES S. HEATH.

In presence of—
J. EDW. MAYBEE,
N. C. DICKSON.